S. GUILD.
Hand-Seeder.
No. 52,563.
Patented Feb 13, 1866.
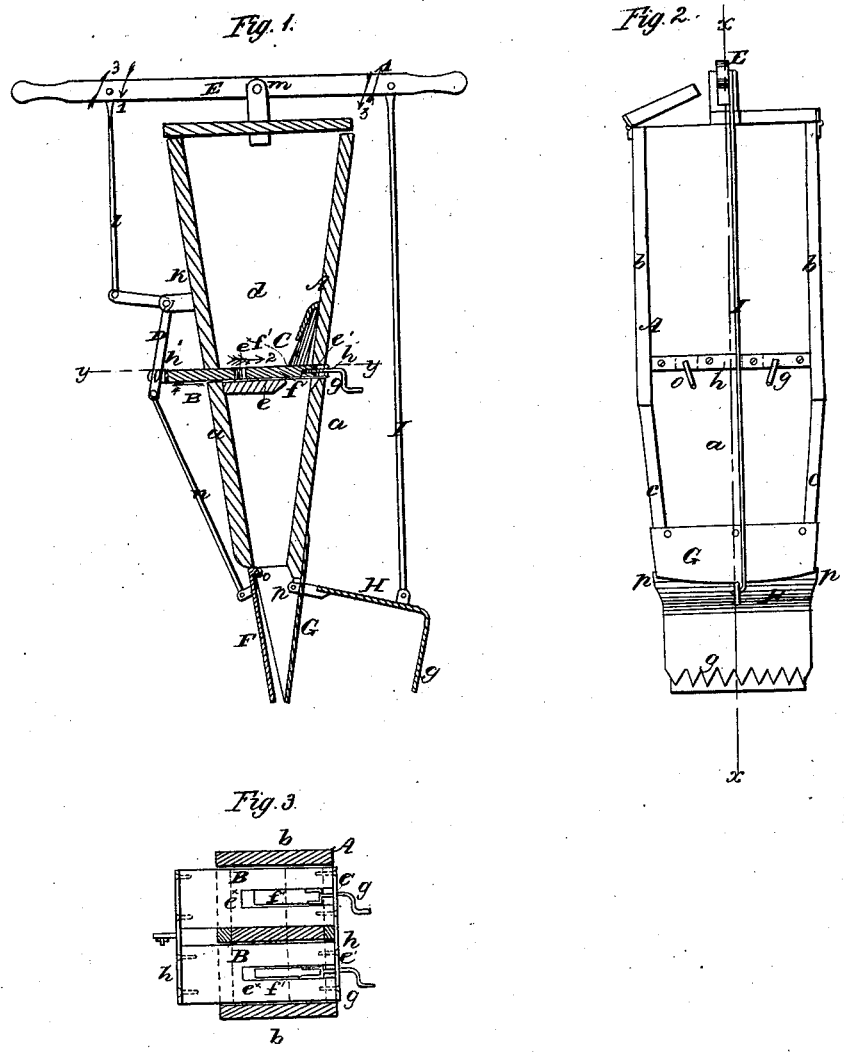

UNITED STATES PATENT OFFICE.

SPENCER GUILD, OF MILFORD, NEW HAMPSHIRE.

IMPROVEMENT IN SEEDER AND FERTILIZER COMBINED.

Specification forming part of Letters Patent No. 52,563, dated February 13, 1866.

*To all whom it may concern:*

Be it known that I, SPENCER GUILD, of Milford, in the county of Hillsborough and State of New Hampshire, have invented a new and Improved Combination of a Hand Seeding-Machine and Manure-Distributer; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\,x$, Fig. 2; Fig. 2, a side view of the same; Fig. 3, a horizontal section taken in the line $y\,y$, Fig. 1.

Similar letters of reference indicate like parts.

This invention relates to a new and improved implement for sowing and planting seed by hand and distributing a fertilizer at the same time.

The invention consists in a novel mechanism employed, whereby all the parts necessary to effect the result or perform the work above specified may be operated by a single lever and with the greatest facility, as hereinafter fully shown and described.

A represents a box two opposite sides, $a\,a$, of which are inclined, as shown in Fig. 1, the other two sides having parallel upper parts, $b\,b$, and slightly-inclined lower parts, $c\,c$, as shown in Fig. 2. This box A may be of any suitable dimensions, and it is provided with a vertical partition, $d$, placed centrally within it and extending down a short distance below a horizontal partition, $e$, placed a trifle below the center of the box. (See Fig. 1.) This partition $e$ does not extend entirely across the box A, openings or spaces $f$ being allowed at one end. (Shown in Fig. 1.)

B B represent two slides, which work horizontally through the box A and rest upon the partition $e$, a slide being at each side of the partition $d$. These slides B have each a longitudinal slot, $e'$, in them, and a slide, $f'$, fitted in each slot, the slides being adjusted or moved by screws $g$, which pass through female threads or screws in a metal plate, $h$, which connects the slides B B at one end. The opposite ends of the slides B B are connected by a similar plate, $h'$. (See more particularly Fig. 3.) By adjusting the slide $f'$ through the medium of the screws $g$, discharge-openings $c^*$, of greater or less capacity, may be obtained for the seed and fertilizing material to pass through.

In the box A, above the slides B B, there are cut-offs C, said cut-offs being over the openings or spaces $f$.

One end of the slides B B (the plate $h'$) is connected to the lower end of a bent or knee lever, D, the fulcrum $j$ of which is in a bracket, $k$, attached to one of the sides $a$ of the box A, and the upper end of lever D is connected by a rod, $l$, with a lever, E, at the upper end of box A, the rod $l$ being connected to lever E near one of its ends, the fulcrum-pin $m$ being at the center of lever E. The lower end of lever D is also connected, by a rod, $n$, with a metal plate, F, the upper end of which is connected, by a joint, $o$, with the lower end of one of the sides $a$ of the box A, as shown clearly in Fig. 1. The lower end of the other side $a$ of the box A has a metal scoop-shaped box, G, attached to it, against which the plate F closes. The box G has a metal plate, H, connected to it by pivots $p$, and the outer part of this plate is bent down and notched or serrated, as shown at $q$ in Fig. 2. This plate H is connected, by a rod, I, with the lever E near the end opposite to that near where the rod $l$ is connected.

From the above description it will be seen that by working the lever E the slides B B will be operated, and also the plates F and H. The seed is placed in one of the compartments in the upper part of box A and the manure or fertilizer in the other. When the lever E is moved in the direction indicated by the arrows 1 the slides B B will be moved in the direction indicated by arrow 2, and the openings in the slides B will pass underneath the cut-offs C and their contents distributed into the lower part of the box A, which is closed at its lower end in consequence of the plate F being closed against the box G by the movement above alluded to of lever E. When the lever E is moved in the opposite direction, as indicated by arrows 3, the slides B are moved back in the direction indicated by arrow 4, and the discharge-openings in the slides B become filled with seed and manure for a succeeding operation, while the plate F opens or moves out from box G to admit of the discharge of the seed and manure, and the plate H is forced down to cover the seed.

It will, of course, be understood that the lower end of the device is shoved by the operator into the earth before the plate F is opened to discharge the seed and manure, and the opening of said plate forms the hole for the reception of the seed, while the plate H covers the seed dropped at the preceding operation, the lever H being moved in the direction of arrows 4 while the implement is being raised and before the lower end of box A is shoved into the ground for a succeeding dropping.

Having thus described my invention, I claim as new and desire to secure by Letters Patent—

1. The combination of a manure or fertilizer distributer with a hand seed-machine, substantially as described.

2. The plate or coverer H, applied to a hand seeding-machine either with or without the manure-distributer, to operate in the manner substantially as set forth.

3. The levers E and D for operating the slides B (one or more) and plate F, substantially as described.

4. The combination of the levers E D, slides B, (one or more,) plate F, and the coverer or plate H, all connected and arranged to operate in the manner substantially as and for the purpose specified.

The above specification of my invention signed by me this 17th day of November, 1865.

SPENCER GUILD.

Witnesses:
J. L. SPRING,
W. C. KIDDER.